(12) United States Patent
Tsubaki et al.

(10) Patent No.: US 10,236,128 B2
(45) Date of Patent: Mar. 19, 2019

(54) ELECTROLYTIC CAPACITOR PRODUCTION METHOD

(71) Applicant: Panasonic Intellectual Property Management Co., Ltd., Osaka (JP)

(72) Inventors: Yuichiro Tsubaki, Kyoto (JP); Masahiro Kajimura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 112 days.

(21) Appl. No.: 15/617,712

(22) Filed: Jun. 8, 2017

(65) Prior Publication Data

US 2017/0271085 A1    Sep. 21, 2017

Related U.S. Application Data

(63) Continuation of application No. PCT/JP2015/006193, filed on Dec. 11, 2015.

(30) Foreign Application Priority Data

Dec. 25, 2014  (JP) ................................. 2014-262694

(51) Int. Cl.
*B05D 5/12*    (2006.01)
*H01G 9/00*    (2006.01)
*H01G 9/028*   (2006.01)
*H01G 9/012*   (2006.01)
(Continued)

(52) U.S. Cl.
CPC .......... *H01G 9/0032* (2013.01); *H01G 9/012* (2013.01); *H01G 9/025* (2013.01); *H01G 9/028* (2013.01); *H01G 9/15* (2013.01)

(58) Field of Classification Search
CPC ...... H01G 9/0032; H01G 9/012; H01G 9/025; H01G 9/028; H01G 9/15
See application file for complete search history.

(56) References Cited

U.S. PATENT DOCUMENTS 6,468,317 B1 * 10/2002 Strange ................ H01G 9/0036
                                                    29/25.03
9,373,448 B2 *  6/2016 Majima ................ H01G 9/0029
(Continued)

FOREIGN PATENT DOCUMENTS

JP    2006-287182    10/2006
JP    2014-067949     4/2014
(Continued)

OTHER PUBLICATIONS

International Search Report of PCT application No. PCT/JP2015/006193 dated Feb. 16, 2016.

*Primary Examiner* — Austin Murata
(74) *Attorney, Agent, or Firm* — McDermott Will & Emery LLP

(57) ABSTRACT

An electrolytic capacitor production method is performed in the following procedure. An anode body having a dielectric layer is impregnated with a dispersion containing a conductive polymer and a first solvent. Then, a pH of the dispersion with which the anode body has been impregnated is adjusted or a base is added to the dispersion with which the anode body has been impregnated. Then, at least a part of the first solvent is removed from the anode body.

11 Claims, 3 Drawing Sheets

(51) Int. Cl.
*H01G 9/025* (2006.01)
*H01G 9/15* (2006.01)

(56) References Cited

U.S. PATENT DOCUMENTS

| | | | | |
|---|---|---|---|---|
| 2003/0024110 A1* | 2/2003 | Fujii | ............... | H05K 3/0097 29/829 |
| 2003/0133256 A1* | 7/2003 | Yoshida | ............... | H01G 9/0036 361/523 |
| 2008/0250620 A1* | 10/2008 | Qiu | ............... | H01G 9/0036 29/25.03 |
| 2011/0205691 A1* | 8/2011 | Fujita | ............... | H01G 9/012 361/528 |
| 2012/0233827 A1* | 9/2012 | Miyachi | ............... | H01G 9/0032 29/25.03 |
| 2013/0059064 A1* | 3/2013 | Majima | ............... | H01G 9/0029 427/80 |
| 2013/0279079 A1* | 10/2013 | Merker | ............... | H01G 9/0029 361/528 |
| 2014/0334066 A1 | 11/2014 | Sugihara et al. | | |

FOREIGN PATENT DOCUMENTS

| | | |
|---|---|---|
| JP | 2014-090107 | 5/2014 |
| WO | 2013/094462 | 6/2013 |

\* cited by examiner

ELECTROLYTIC CAPACITOR PRODUCTION METHOD

RELATED APPLICATIONS

This application is a Continuation of International Application No. PCT/JP2015/006193, filed on Dec. 11, 2015, which in turn claims priority from Japanese Patent Application No. 2014-262694, filed on Dec. 25, 2014, the contents of all of which are incorporated herein by reference in their entireties.

BACKGROUND

1. Technical Field

The present disclosure relates to an electrolytic capacitor including a conductive polymer layer (solid electrolyte layer), and an electrolytic capacitor production method.

2. Description of the Related Art

Along with digitalization of electronic devices, small-sized and large capacitance capacitors, which are used in the electronic devices, having low equivalent series resistance (ESR) in a high frequency range have been demanded.

Promising candidates as small-sized, large capacitance, and low ESR capacitors are electrolytic capacitors including as a cathode material a conductive polymer such as polypyrrole, polythiophene, polyfuran, or polyaniline. For example, an electrolytic capacitor including a dielectric layer-formed anode foil (anode body), and a conductive polymer layer (solid electrolyte layer) as a cathode material, which is provided on the anode foil, is proposed.

In WO 2013/094462, from the viewpoint of, for example, reducing the ESR, it is proposed that a conductive polymer layer be formed on an anode body having a dielectric layer with use of a conductive polymer dispersion, and then the conductive polymer layer-formed anode body be impregnated with a conductive auxiliary liquid containing an aromatic compound having, for example, a hydroxyl group and a carboxyl group.

In Unexamined Japanese Patent Publication No. 2006-287182, from the viewpoint of, for example, suppressing corrosion of a dielectric layer, reducing the ESR, and increasing the electrostatic capacity, it is proposed that a solid electrolyte layer be formed with use of a conductive polymer solution whose pH is adjusted to 3 to 13.

SUMMARY

An electrolytic capacitor production method according to a first aspect of the present disclosure includes impregnating an anode body having a dielectric layer with a dispersion containing a conductive polymer and a first solvent, adjusting a pH of the dispersion with which the anode body has been impregnated, and removing at least a part of the first solvent from the anode body after adjusting the pH of the dispersion.

An electrolytic capacitor production method according to a second aspect of the present disclosure includes impregnating an anode body having a dielectric layer with a dispersion containing a conductive polymer and a first solvent, adding a base to the dispersion with which the anode body has been impregnated, and removing at least a part of the first solvent from the anode body after adding the base to the dispersion.

According to the aspects of the present disclosure, damage to a dielectric film can be suppressed so that leakage current can be decreased. In addition, a film formation property of a conductive polymer is not deteriorated so that better electrostatic capacity and ESR characteristics can be obtained.

DETAILED DESCRIPTION OF EMBODIMENT

Prior to description of an exemplary embodiment of the present disclosure, problems of a conventional electrolytic capacitor are described.

A dispersion used for forming a conductive polymer layer contains, in addition to a conductive polymer, a dopant having an anionic group such as a sulfonate group, so that the dispersion has a low pH. When an anode body having a dielectric layer is impregnated with the dispersion having a low pH, the dielectric layer is corroded and is likely to be damaged. A damaged dielectric layer causes an increase in leakage current.

If the dispersion is adjusted to have an approximate neutral pH in advance to suppress damage to the dielectric layer, the dispersion is likely to aggregate to decrease a pot life. If a dispersion whose pH has been adjusted in advance is used, the dispersion is not sufficiently permeated into the anode body, so that a film formation property of a conductive polymer is deteriorated to decrease the electrostatic capacity and increase the ESR.

The present disclosure provides a method for producing an electrolytic capacitor that has low leakage current and better electrostatic capacity and ESR characteristics.

Hereinafter, an exemplary embodiment of an electrolytic capacitor production method according to the present disclosure is described with reference to drawings. The exemplary embodiment below, however, is not for limiting the present disclosure.

<<Electrolytic Capacitor>>

Figure 1:
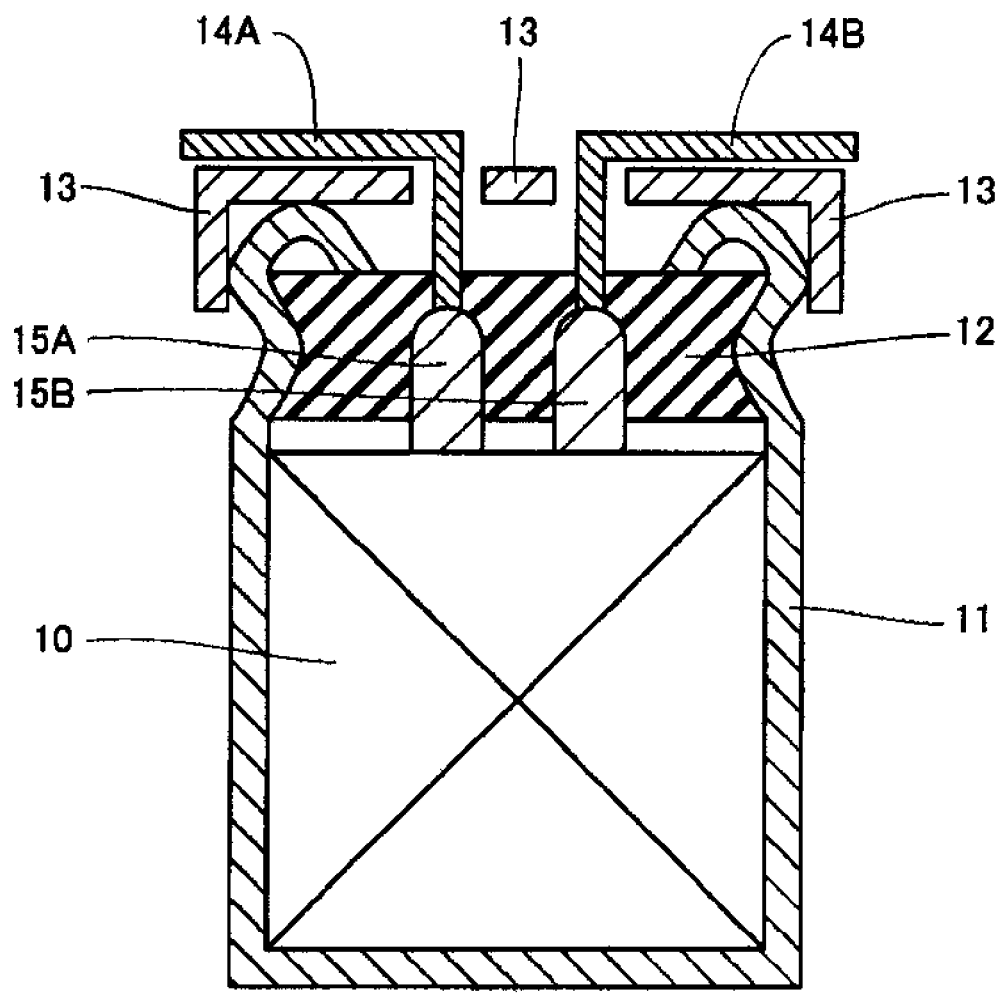
FIG. 1 is a schematic sectional view illustrating an electrolytic capacitor obtained by a production method according to an exemplary embodiment of the present disclosure.
Figure 2:
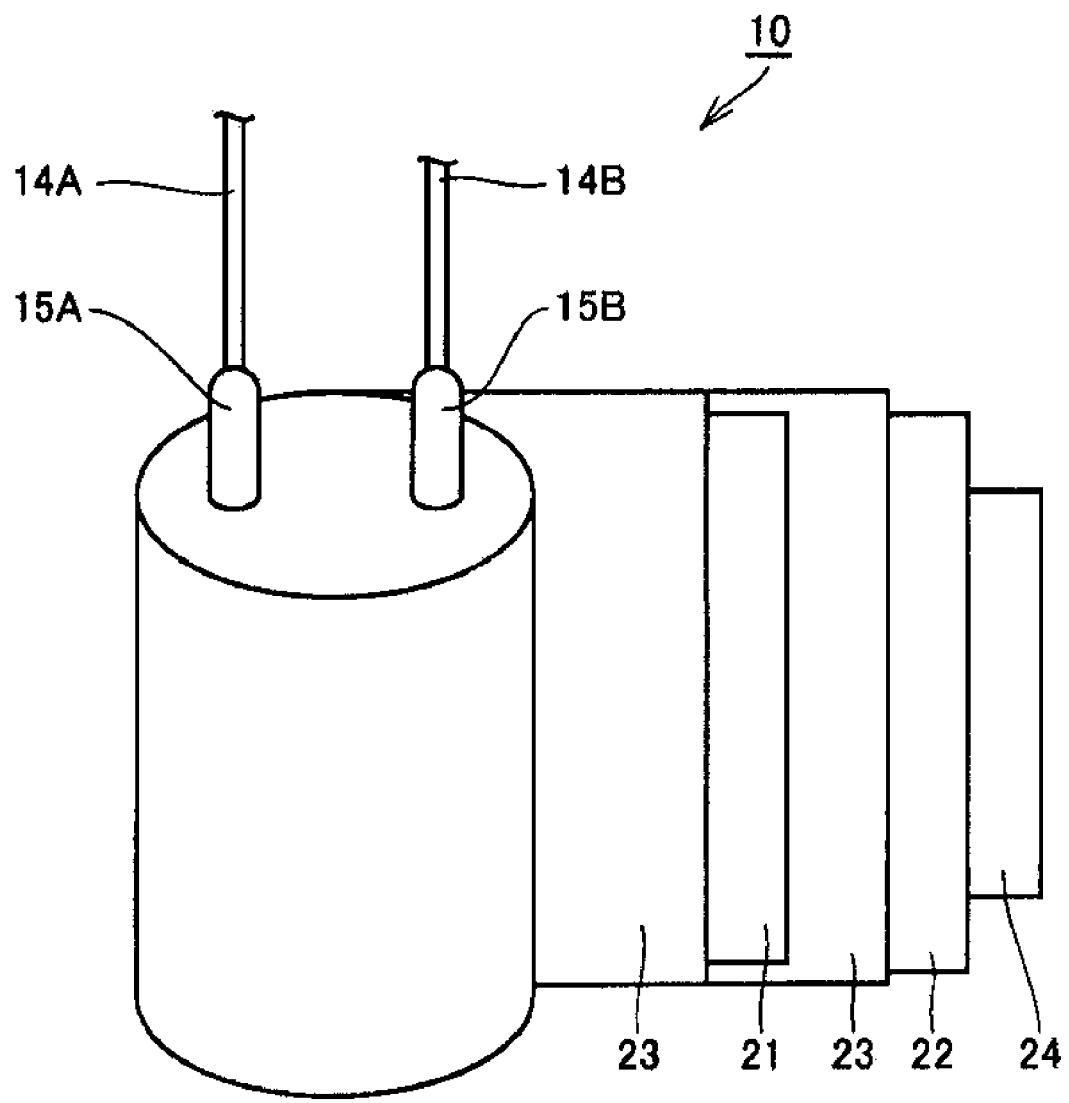
FIG. 2 is a schematic view illustrating a configuration of a capacitor element of the electrolytic capacitor in FIG. 1.

FIG. 1 is a schematic sectional view illustrating an electrolytic capacitor obtained by a production method according to an exemplary embodiment of the present disclosure. FIG. 2 is a schematic view illustrating a partially developed capacitor element included in the same electrolytic capacitor.

In FIG. 1, the electrolytic capacitor includes capacitor element 10 having anode body 21 on which a dielectric layer is formed; and a conductive polymer (not shown) covering at least a part of a surface (or attached to at least a part of a surface) of the dielectric layer. Capacitor element 10 is housed in an outer case in a state in which at least a part of the surface of the dielectric layer is covered with the conductive polymer. The outer case includes bottomed case 11 in which capacitor element 10 is housed, insulating sealing member 12 that seals an opening of bottomed case 11, and base plate 13 that covers sealing member 12. Bottomed case 11 is, at a part near an opening end, processed inward by drawing, and is, at the opening end, curled so as to swage sealing member 12.

For example, capacitor element 10 as shown in FIG. 2 is referred to a wound body. Capacitor element 10 includes anode body 21 connected to lead tab 15A, cathode body 22 connected to lead tab 15B, and separator 23. Anode body 21 and cathode body 22 are wound with separator 23 interposed between the anode body and the cathode body. An outermost periphery of capacitor element 10 is fixed with fastening tape 24. FIG. 2 shows partially developed capacitor element 10 before the outermost periphery of the capacitor element is fixed.

Anode body 21 includes a metal foil whose surface is roughened so as to include projections and recesses, and a dielectric layer is formed on the metal foil, which has the projections and recesses.

In the electrolytic capacitor, the conductive polymer is attached so as to cover at least a part of the surface of the dielectric layer formed on anode body 21. The attachment, however, is not limited to this case, and the conductive polymer may be attached to any position between anode body 21 and cathode body 22. For example, the conductive polymer covers at least a part of the surface of the dielectric layer formed on anode body 21, and may further cover at least a part of a surface of cathode body 22 and/or at least a part of a surface of separator 23. In the electrolytic capacitor, the conductive polymer (specifically, a film including the conductive polymer) that covers at least a part of the surface of, for example, the anode body, the cathode body, and the separator is generally referred to as a solid electrolyte layer (or a conductive polymer layer) in some cases.

The electrolytic capacitor may further include an electrolyte solution. In this case, the electrolyte solution is housed in the outer case (specifically, bottomed case 11) together with capacitor element 10 in which at least a part of the surface of the dielectric layer is covered with the conductive polymer.

<<Method for Producing Electrolytic Capacitor>>

Figure 3:
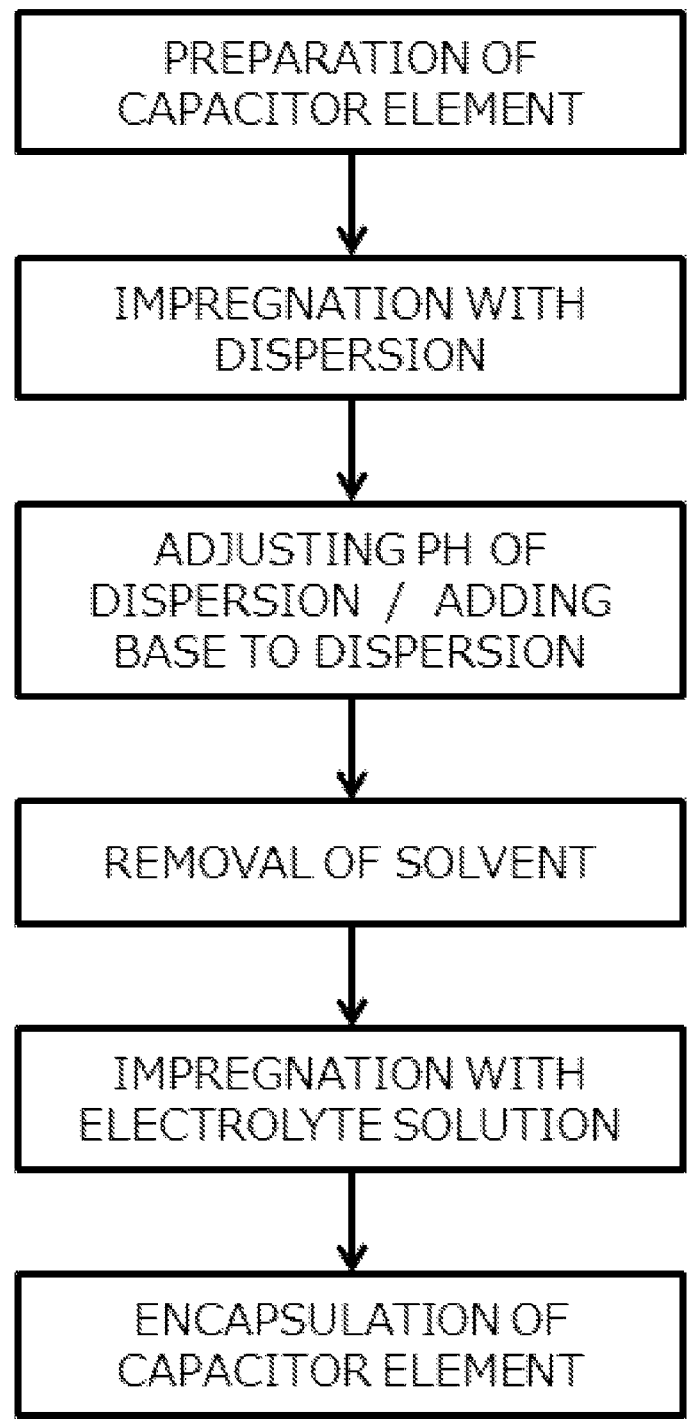
FIG. 3 is a flow chart illustrating steps of electrolytic capacitor production according to the present exemplary embodiment.

Hereinafter, an example of a method for producing an electrolytic capacitor according to the exemplary embodiment of the present disclosure is described according to each of steps. FIG. 3 is a flow chart illustrating steps of electrolytic capacitor production according to the present exemplary embodiment.

(i) Step of Preparing Capacitor Element 10
(i-1) Step of Preparing Anode Body 21 on Which a Dielectric Layer is Formed First, a raw material of anode body 21, i.e., a metal foil is prepared. A type of the metal is not particularly limited, but it is preferable to use a valve metal such as aluminum, tantalum, or niobium, or an alloy including a valve metal, from the viewpoint of facilitating formation of the dielectric layer.

Next, a surface of the metal foil is roughened. By the roughening, a plurality of projections and recesses are formed on the surface of the metal foil. The roughening is preferably performed by etching the metal foil. The etching may be performed by, for example, a DC electrolytic method or an AC electrolytic method.

Next, a dielectric layer is formed on the roughened surface of the metal foil. A method for forming the dielectric layer is not particularly limited, and the dielectric layer can be formed by subjecting the metal foil to an anodizing treatment. The anodizing treatment may be performed by, for example, immersing the metal foil in an anodizing solution such as an ammonium adipate solution. In the anodizing treatment, a voltage may be applied in a state in which the metal foil is immersed in the anodizing solution, as necessary.

Normally, a large metal foil formed of, for example, a valve metal is subjected to a roughening treatment and an anodizing treatment from the viewpoint of mass productivity. In this case, the treated foil is cut into a desired size to prepare anode body 21.

(i-2) Step of Preparing Cathode Body 22

A metal foil may also be used for cathode body 22 as with the anode body. A type of the metal is not particularly limited, but it is preferable to use a valve metal such as aluminum, tantalum, or niobium, or an alloy including a valve metal. A surface of the metal foil may be roughened as necessary.

Further, on the surface of cathode body 22 may be provided an anodizing film, a film of a metal different from the metal that constitutes the cathode body (different type of metal), or a nonmetal film. Examples of the different type of metal and the nonmetal include metals such as titanium and nonmetals such as carbon, respectively.

(i-3) Step of Manufacturing Capacitor Element (Wound Body) 10

Next, capacitor element 10 is manufactured with anode body 21 and cathode body 22. The capacitor element can be obtained by stacking anode body 21 and cathode body 22 with separator 23 interposed between the anode body and the cathode body. Anode body 21 and cathode body 22 may be wound with the separator interposed between the anode body and the cathode body to form a wound body as shown in FIG. 2. At this time, the winding may be conducted while lead tabs 15A, 15B are rolled in the anode body, the cathode body and the separator, to cause lead tabs 15A, 15B to stand up from the wound body as shown in FIG. 2.

As separator 23, for example, a nonwoven fabric may be used. The nonwoven fabric includes a fiber of, for example, cellulose, polyethylene terephthalate, a vinylon, or a polyamide (e.g., an aliphatic polyamide and an aromatic polyamide such as aramid).

A material for lead tabs 15A, 15B is not particularly limited as long as the material is a conductive material. Surfaces of lead tabs 15A, 15B may be subjected to an anodizing treatment. Further, lead tabs 15A, 15B may be covered with a resin material at a part in contact with sealing member 12 and a part connected to lead wires 14A, 14B.

A material for lead wires 14A, 14B connected to lead tabs 15A, 15B, respectively, is not also particularly limited, and, for example, a conductive material may be used.

Then, fastening tape 24 is disposed on an end of an outer surface of anode body 21, cathode body 22 or separator 23, which is positioned at an outermost layer of the wound body (cathode body 22 in FIG. 2), to fix the end with fastening tape 24. When anode body 21 is prepared by cutting a large metal foil, the capacitor element in a state of, for example, a wound body, may further be subjected to an anodizing treatment in order to provide a dielectric layer on a cutting surface of anode body 21.

(ii) Step of Impregnating Capacitor Element (Wound Body) 10 With Dispersion (First Step)

Next, capacitor element 10 is impregnated with a dispersion containing a conductive polymer and a solvent (first solvent).

Impregnation of capacitor element 10 with the dispersion is not particularly limited as long as the dispersion can be applied to at least the anode body (particularly, at least the dielectric layer). For example, the capacitor element may be immersed in the dispersion, or the dispersion may be injected into the capacitor element. The impregnation may be conducted under atmospheric pressure, but may also be conducted in an atmosphere under a reduced pressure ranging, for example, from 10 kPa to 100 kPa, both inclusive, preferably from 40 kPa to 100 kPa, both inclusive. The impregnation may also be conducted under ultrasonic vibration as necessary. An impregnation period depends on a size of capacitor element 10, but ranges, for example, from 1 second to 5 hours, both inclusive, preferably from 1 minute to 30 minutes, both inclusive. By this step, the dispersion is applied to capacitor element 10.

Examples of the conductive polymer include polypyrrole, polythiophene, polyfuran, polyaniline, polyacetylene, polyphenylene, polyphenylene vinylene, polyacene, and polythiophene vinylene. A single one or two or more in combination of these conductive polymers may be used, or a copolymer of two or more monomers may also be used.

In the present specification, polypyrrole, polythiophene, polyfuran, polyaniline, and the like mean polymers having, as a basic skeleton, polypyrrole, polythiophene, polyfuran, polyaniline, and the like, respectively. Therefore, polypyrrole, polythiophene, polyfuran, polyaniline, and the like also include their derivatives. For example, polythiophene includes poly(3,4-ethylene dioxythiophene) and the like.

The conductive polymer may include a dopant. As the dopant, a polyanion can be used. Specific examples of the polyanion include polyvinylsulfonic acid, polystyrenesulfonic acid, polyallylsulfonic acid, polyacrylsulfonic acid, polymethacrylsulfonic acid, poly(2-acrylamido-2-methylpropanesulfonic acid), polyisoprenesulfonic acid, and polyacrylic acid. Especially, a polyanion derived from polystyrenesulfonic acid is preferable. A single one or two or more in combination of these polyanions may be used. These polyanions may be a polymer of a single monomer or a copolymer of two or more monomers.

A weight average molecular weight of the polyanion is not particularly limited, and ranges, for example, from 1,000 to 1,000,000, both inclusive. A conductive polymer including such a polyanion is easily and uniformly dispersed in a solvent, facilitating uniform attachment of the conductive polymer to a surface of the dielectric layer.

In the dispersion, the conductive polymer is, in a state of particle dispersed in the solvent (first solvent). The dispersion can be obtained by, for example, polymerizing, in the first solvent, a raw material of the conductive polymer (e.g., a precursor such as a monomer and/or an oligomer of the conductive polymer) in the presence of a dopant to generate particles of the conductive polymer including the dopant.

The first solvent is not particularly limited, and may be water or a nonaqueous solvent (e.g., an organic solvent and an ionic liquid). As the first solvent, a polar solvent is especially preferable. The polar solvent may be a protic solvent or an aprotic solvent.

Examples of the protic solvent include a monohydric alcohol (e.g., methanol, ethanol, propanol, and butanol); a polyhydric alcohol (e.g., alkylene glycols such as ethylene glycol and propylene glycol, polyalkylene glycols such as polyethylene glycol, and glycerins such as glycerin and polyglycerin); glycol monoethers such as diethylene glycol monobutyl ether; formaldehyde; and water.

Examples of the aprotic solvent include amides such as N-methylacetamide, N,N-dimethylformamide, and N-methyl-2-pyrrolidone; esters such as methyl acetate; ketones such as methyl ethyl ketone and γ-butyrolactone; ethers (cyclic ethers) such as 1,4-dioxane; sulfones such as dimethyl sulfoxide and sulfolane; and carbonate compounds (e.g., cyclic carbonates) such as propylene carbonate.

Especially, the first solvent is preferably a protic solvent. Particular the first solvent preferably contains water. In this case, handleability of the dispersion and dispersibility of the conductive polymer are improved. When the first solvent contains a polyhydric alcohol, the conductive polymer swells so that the conductive polymer is likely to be sequenced. And thus the electric conductivity of the solid electrolyte layer can be further increased (that is, the ESR can be further lowered). Accordingly, it is preferable that the first solvent also contains a polyhydric alcohol, and it is also preferable that the first solvent contains at least water and a polyhydric alcohol.

An amount of the first solvent in the dispersion with which the anode body has been impregnated ranges preferably from 100 parts by mass to 1000000 parts by mass, both inclusive, more preferably from 1000 parts by mass to 100000 parts by mass, both inclusive, relative to 100 parts by mass of the conductive polymer, immediately before adjusting a pH (or adding a base) in a second step. With the amount of the first solvent in such ranges, it is easy to more evenly diffuse a base into the conductive polymer layer and/or deep into fine pores of the anode body.

Particles of the conductive polymer dispersed in the dispersion preferably have a median diameter ranging from 0.01 μm to 0.5 μm, both inclusive, in a volume particle size distribution obtained by measurement with a particle diameter measuring apparatus according to dynamic light scattering (hereinafter, simply referred to as a median diameter according to dynamic light scattering). A particle diameter of the conductive polymer can be adjusted by, for example, polymerization conditions and dispersion conditions.

Concentration of the conductive polymer (including a dopant or a polyanion) in the dispersion preferably ranges from 0.5% by mass to 10% by mass, both inclusive. The dispersion having such a concentration is suitable for attachment of an appropriate amount of the conductive polymer and is easily impregnated into capacitor element 10 to give advantages for improvement of productivity.

After the first step, a part of the first solvent may be removed as necessary. However, from the viewpoint of facilitating adjustment of the pH (or facilitating addition or diffusion of a base) in the second step, it is preferably to subject the capacitor element (particularly, the anode body), in which at least a part of the first solvent remains, to the second step. When a part of the first solvent is removed after the first step, the first solvent may be removed by vaporization under heating, or may be removed under reduced pressure as necessary.

(iii) Second Step

In the second step, the pH of the dispersion with which the capacitor element (particularly, the anode body having the dielectric layer) has been impregnated is adjusted (step 2a) or a base is added to the dispersion with which the capacitor element (particularly, the anode body having the dielectric layer) has been impregnated (step 2b).

The conductive polymer normally includes a dopant having an anionic group, so that the dispersion is acidic impregnation of the anode body with an acidic dispersion causes damage to the dielectric layer due to corrosion. If the pH of the dispersion is adjusted (specifically, increased in basicity) or a base is added to the dispersion before the anode body is impregnated, the conductive polymer in the dispersion aggregates to decrease permeability of the dispersion into the anode body and a pot life is also decreased. In the present exemplary embodiment, the pH of the dispersion is adjusted or a base is added to the dispersion while the capacitor element (particularly, the anode body having the dielectric layer) is impregnated with the dispersion, in the second step (specifically, the step 2a or 2b). With the second step, it is possible to suppress damage to the dielectric layer, so that leakage current can be reduced. It is also possible to suppress aggregation of the conductive polymer in the dispersion, so that the film formation property of a conductive polymer is prevented from being deteriorated. Accordingly, the electrostatic capacity can be increased. In addition, it becomes easy to secure high conductivity in the solid electrolyte layer that is formed by attachment of the conductive polymer, so that the ESR can be reduced.

In the step 2a, it is preferable to adjust the pH of the dispersion, with which the capacitor element (particularly, the anode body) has been impregnated, from original acidity to a more basic side (particularly, around neutrality), in particular, it is preferable to adjust the pH of the dispersion as close as possible to a pH of 7. The dispersion after adjusting the pH (or after adding a base) has a pH ranging preferably from 2.8 to 8.3, both inclusive, more preferably from 4.0 to 7.0, both inclusive. The pH of the dispersion at this time can be measured by taking out the dispersion after adjusting the pH (or the dispersion after adding a base) with which the capacitor element (or the anode body) has been impregnated by a known method (e.g., centrifugal separation).

In the meantime, the dispersion before adjusting the pH (or adding a base) has a lower pH than the pH of the dispersion after adjusting the pH (or adding a base). And, it is preferable that the dispersion before adjusting the pH (or adding a base), for example, has a pH ranging from 1.0 to 4.0, both inclusive, more preferably a pH equal to or more than 1.0, and less than 2.8 (e.g., from 1.0 to 2.0, both inclusive). When the dispersion has a pH in such ranges, stability of the dispersion can be improved (that is, aggregation of a polymer is unlikely to occur until immediately before the impregnation of the capacitor element). It is considered that the dispersion before adjusting the pH has the same pH as the pH of the dispersion before the impregnation of the capacitor element (or the anode body).

A method for adjusting the pH of the dispersion is not particularly limited and a known method can be used, and adjustment may be performed by adding to the dispersion a substance that is more basic than the dispersion. As such a substance, it is preferable to use a base.

In the steps 2a and 2b, the base (e.g., a powder or liquid base) may be directly added to the dispersion or may be added to the dispersion in a form of a solution containing the base and a solvent (second solvent). It is preferable to use a liquid base or a base solution so that the base is easily diffused in the dispersion. As the second solvent contained in the base solution, there can be appropriately selected from the solvents exemplified for the first solvent, and it is preferable to use, for example, water, a protic solvent, or a mixed solvent of water with an organic solvent (e.g., a protic solvent). The second solvent preferably contains a polyhydric alcohol or may contain a polyhydric alcohol and a protic solvent (e.g., water and a protic organic solvent) other than a polyhydric alcohol. When the base solution contains a polyhydric alcohol, the conductive polymer swells so that the conductive polymer is likely to be sequenced. And thus it is further advantageous to reduce the ESR.

A method for adding the base is not particularly limited as long as the base can be mixed (or diffused) in the dispersion with which the capacitor element (particularly, the anode body) has been impregnated. For example, a powder base may be sprayed to the capacitor element in which the solvent contained in the dispersion remains. Alternatively, the capacitor element that has been impregnated with the dispersion may be impregnated with a liquid base or a base solution. The impregnation may be conducted specifically by immersing the capacitor element in a liquid base or a base solution, or injecting a liquid base or a base solution into the capacitor element, for example.

The impregnation can be conducted under atmospheric pressure or reduced pressure, and may be conducted under ultrasonic vibration as necessary. The impregnation may also be conducted under heating as necessary.

Examples of the base used in the step 2a or 2b include metal hydroxides (e.g., alkali metal hydroxides such as sodium hydroxide and potassium hydroxide and alkaline-earth metal hydroxides such as magnesium hydroxide) and nitrogen-containing bases (e.g., ammonia and an amine). A single one or two or more in combination of the bases can be used. The base preferably includes a nitrogen-containing base.

Examples of the amine include an aliphatic amine, an alicyclic amine cyclohexyl amine and isophoronediamine), an aromatic amine (e. aniline and diaminobenzene), and a cyclic amine. The amine may be any of a primary amine, a secondary amine, and a tertiary amine. The amine is not limited to a monoamine but may be a polyamine such as a diamine.

From the viewpoint of easy diffusion in the dispersion, the amine is preferably an aliphatic amine and a cyclic amine Examples of the aliphatic amine include an alkylamine mono($C_{1-6}$ alkyl)amines such as methylamine and ethylamine: di($C_{1-6}$ alkyl)amines such as diethylamine; and tri($C_{1-6}$ alkyl)amines such as triethylamine) and a diaminoalkane ethylenediamine). Examples of the cyclic amine include 5-membered cyclic amine to 8-membered cyclic amine such as pyrrol, imidazole, imidazoline, piperidine, piperazine, morpholine, and pyridine.

These amines may have a substituent such a hydroxyl group, an alkoxy group (e.g., $C_{1-6}$ alkoxy groups or $C_{1-4}$ alkoxy groups, such as methoxy and ethoxy) and/or a hydroxyalkoxyalkyl group (e.g., hydroxy $C_{1-4}$ alkoxy $C_{1-4}$ alkyl groups such as hydroxyethoxyethyl). Examples of the amine having such substituents include alkanolamines (e.g., $C_{1-4}$ alkanolamines that may have 1 to 3 $C_{1-4}$ alkyl groups in an amino group) such as ethanolamine and dimethylaminoethanol, and aminoalkoxyalkanols (e.g., amino $C_{1-4}$ alkoxy $C_{1-4}$ alkanols that may have 1 to 3 $C_{1-4}$ alkyl groups in an amino group) such as aminoethoxyethanol and dimethylaminoethoxyethanol. Further, the cyclic amine includes one that has, as a substituent, an alkyl group (e.g., $C_{1-4}$ alkyl groups such as methyl and ethyl), an alkoxy group (e.g., $C_{1-4}$ alkoxy groups such as methoxy and ethoxy), and/or an amino group.

Among the bases, preferred are, for example, ammonia, an aliphatic amine (e.g., an alkyl amine, an alkanol amine, and an aminoalkoxyalkanol), and a cyclic amine.

An amount of the base to be added relative to the dispersion can be appropriately determined in such a range that allows the pH of the dispersion to be adjusted to the ranges described above, for example.

(iv) Step of Removing Solvent From Capacitor Element 10 (Third Step)

In a third step, at least a part of a solvent component is removed from capacitor element 10 (or the anode body) after the second step. The solvent component includes the first solvent contained in the dispersion, and further includes the second solvent in cases where the second solvent is used in the second step. That is, in the third step, at least a part of the first solvent is removed, and further, at least a part of the second solvent may also be removed in cases where capacitor element 10 (or the anode body) includes the second solvent. Alternatively, at least a part of the first solvent is removed and the second solvent may not be removed so that the second solvent is allowed to remain. In the third step, it is sufficient that at least a part of the solvent component (at least the first solvent) is removed. Further, a whole of the first solvent or a whole of the second solvent, or a whole of the first and second solvents may be removed.

The solvent component may be removed by vaporization under heating or may be removed under reduced pressure as necessary.

Through the first and second steps, or the first, second, and third steps, the conductive polymer attaches to at least the dielectric layer so as to cover the dielectric layer, so that the solid electrolyte layer is formed.

The first step, the step of removing the solvent (optional step), the second step, and the third step may be repeated two or more times as necessary. At least one step selected from the group consisting of these steps may be repeated two or more times as necessary. A plurality of steps selected from these steps may be, as a series of steps, repeated two or more times.

(v) Step of Impregnating Capacitor Element 10 With Electrolyte Solution (Fourth Step)

In a fourth step, capacitor element 10 (specifically, the anode body having the dielectric layer) can be impregnated with an electrolyte solution after the third step. The fourth step is not necessarily needed, however, impregnation with the electrolyte solution can further improve a restoration function of the dielectric layer.

The impregnation of capacitor element 10 with the electrolyte solution is not particularly limited and can be conducted by a known method. For example, capacitor element 10 may be immersed in the electrolyte solution, or the electrolyte solution may be injected into a container housing capacitor element 10. The impregnation of capacitor element 10 with the electrolyte solution may be conducted under reduced pressure (e.g., 10 kPa to 100 kPa, both inclusive) as necessary.

As the electrolyte solution, a nonaqueous solvent may be used, or a solution that contains a nonaqueous solvent and an ionic substance (solute) dissolved in the nonaqueous solvent may also be used. The nonaqueous solvent is a collective term for liquids except water and except liquids containing water, and includes an organic solvent and an ionic liquid.

The nonaqueous solvent is preferably a high boiling point solvent (for example, a solvent having a boiling point higher than a boiling point of water). For example, there may be used a polyhydric alcohol alkylene glycols such as ethylene glycol and propylene glycol; polyalkylene glycols such as polyethylene glycol; and glycerins such as glycerin and polyglycerin), cyclic sulfones such as sulfolane, lactones such as γ-butyrolactone (γBL), amides such as N-methylacetamide, N,N-dimethylformamide, and N-methyl-2-pyrrolidone, esters such as methyl acetate, ethers such as 1,4-dioxane, ketones such as methyl ethyl ketone, and formaldehyde. A single one or two or more in combination of the nonaqueous solvents may be used.

As the solute, a salt of an anion and a cation is used, and an organic salt is preferable, in which at least one of the anion and the cation is an organic substance. Examples of the organic salt include trimethylamine maleate, triethylamine borodisalicylate, ethyldimethylamine phthalate, mono 1,2,3,4-tetramethylimidazolinium phthalate, and mono 1,3-dimethyl-2-ethylimidazolinium phthalate. A single one or two or more in combination of the solutes may be used.

(Others)

Capacitor element 10 may be encapsulated. More specifically, first, capacitor element 10 is housed in bottomed case 11 so that lead wires 14A, 14B are positioned on an open upper surface of bottomed case 11. As a material for bottomed case 11, there can be used metals such as aluminum, stainless steel, copper, iron and brass, or an alloy of these metals.

Next, sealing member 12 formed so as to allow lead wires 14A, 14B to penetrate the sealing member is disposed above capacitor element 10 to encapsulate capacitor element 10 in bottomed case 11. Sealing member 12 is sufficient as long as the sealing member is an insulating substance. As the insulating substance, an elastic body is preferable, and, for example, high heat resistance silicone rubber, fluororubber, ethylene propylene rubber, chlorosulfonated polyethylene rubber (e.g., Hypalon rubber), butyl rubber or isoprene rubber is especially preferable.

Next, bottomed case 11 is, at a part near an opening end, processed by transverse drawing, and is, at the opening end, curled so as to swage sealing member 12. Then, base plate 13 is disposed on a curled part of the bottomed case to complete the electrolytic capacitor as shown in FIG. 1. Subsequently, an aging treatment may be performed while a rated voltage is applied.

In the exemplary embodiment described above, a wound electrolytic capacitor has been described. The application range of the present disclosure, however, is not limited to the wound electrolytic capacitor aid can be applied to other electrolytic capacitors such as a chip electrolytic capacitor including a metal sintered body as an anode body, and a laminated electrolytic capacitor including a metal plate as an anode body.

EXAMPLES

Hereinafter, the present disclosure is specifically described by way of examples and comparative examples. The present disclosure, however, is not limited to the examples below.

Example 1

A wound electrolytic capacitor (diameter: 10 mm, length: 10 mm) having a rated voltage of 25 V and a rated electrostatic capacity of 330 µF, as shown in FIG. 1, was manufactured in the following procedure, and evaluation for the electrolytic capacitor was conducted.

(1) Manufacturing of Electrolytic Capacitor
(Preparation of Anode Body Having Dielectric Layer)

A 100-µm-thick aluminum foil was subjected to etching to roughen a surface of the aluminum foil. Then, a dielectric layer was formed on the surface of the aluminum foil by an anodizing treatment with an ammonium adipate aqueous solution to prepare an anode body having the dielectric layer.

(Preparation of Cathode Body)

A 50-µm-thick aluminum foil was subjected to etching to roughen a surface of the aluminum foil to prepare a cathode body.

(Manufacturing of Capacitor Element (Wound Body))

An anode lead tab and a cathode lead tab were connected to the anode body and the cathode body, respectively, and the anode body and the cathode body were wound with a separator interposed between the anode body and the cathode body while the lead tabs were rolled in the anode body, the cathode body and the separator, to give a capacitor element. Ends of the lead tabs protruding from the capacitor element were connected to an anode lead wire and a cathode lead wire, respectively. Then, the manufactured capacitor element was subjected to an anodizing treatment again to form a dielectric layer at a cutting end of the anode body. Next, an end of an outer surface of the capacitor element was fixed with a fastening tape.

(Impregnation With Dispersion)

A mixed solution was prepared by dissolving 3,4-ethylene dioxythiophene and dopant polystyrenesulfonic acid in ion-exchanged water (first solvent). Ferric sulfate and sodium persulfate (an oxidant) dissolved in ion-exchanged water were added to the resultant mixed solution while the mixed solution was stirred, to cause a polymerization reaction. After the reaction, the resultant reaction solution was dialyzed to remove unreacted monomers and an excessive oxidant, so that a dispersion (dispersion A) was obtained that contained about 5% by mass of poly3,4-ethylene dioxythiophene (PEDOT) (a conductive polymer) doped with polystyrenesulfonic acid. A content of the conductive polymer in the dispersion was 2.4% by mass and a pH of the dispersion was 1.7.

Next, the capacitor element was impregnated with the dispersion A. In the meantime, viscosity of the dispersion A was measured immediately after the preparation and 24 hours after the preparation by a viscometer (VISCOMATE VM-100A) and was 30.0 mPa·s in both cases.

(Adjustment of pH)

Immediately after having been impregnated with the dispersion A, the capacitor element was impregnated with an ammonia solution (containing ammonia and water in a mass ratio of 10:90). At this point of time, dispersions whose pH was adjusted were taken out from a part of capacitor elements by centrifugal separation and were measured for pH values, and the pH values were averaged. The average pH value was 2.8.

(Removal of Solvent Component)

The capacitor element whose pH had been adjusted above was heated at 150° C. for 20 minutes to remove a solvent component (water). Thus, a solid electrolyte layer-formed capacitor element was manufactured.

(Impregnation With Electrolyte Solution)

Next, the capacitor element was impregnated with an electrolyte solution under reduced pressure. Used as the electrolyte solution was a solution containing γBL and mono(ethyldimethylamine) phthalate (solute) in a mass ratio of 75:25.

(Encapsulation of Capacitor Element)

The electrolyte solution-impregnated capacitor element was housed in an outer case as shown in FIG. 1 and encapsulated to manufacture an electrolytic capacitor. A total of 300 electrolytic capacitors were manufactured in the same manner.

(2) Evaluation of Performance

Electrostatic capacity (μF) was measured as initial characteristics of the electrolytic capacitor. Specifically, initial electrostatic capacity (μF) at a frequency of 120 Hz was measured for the electrolytic capacitor with an LCR meter for 4-terminal measurement.

An ESR value (mΩ) was also measured as initial characteristics of the electrolytic capacitor. Specifically, the ESR value (mΩ) at a frequency of 100 kHz was measured for the electrolytic capacitor with an LCR meter for 4-terminal measurement.

The electrolytic capacitor was connected to a 1 kΩ resistor in series, and leakage current (μA) was measured after a rated voltage of 25 V was applied for 1 minute by a DC power source.

The initial electrostatic capacity, the ESR value, and the leakage current were measured for randomly selected 120 electrolytic capacitors, and average values for the initial electrostatic capacity, the ESR value, and the leakage current were calculated, respectively.

Example 2

An electrolytic capacitor was manufactured in the same manner as in Example 1 except for adjusting the pH of the dispersion to 6.8 in adjusting the pH, and the evaluation of performance was conducted for the electrolytic capacitor.

Example 3

An electrolytic capacitor was manufactured in the same manner as in Example 1 except for adjusting the pH of the dispersion to 8.3 in adjusting the pH, and the evaluation of performance was conducted for the electrolytic capacitor.

Example 4

An electrolytic capacitor was manufactured in the same manner as in Example 1 except for, in adjusting the pH, using, in place of the ammonia solution, a solution containing triethylamine and ethanol in a mass ratio of 10:90 and adjusting the pH of the dispersion to 7.1, and the evaluation of performance was conducted for the electrolytic capacitor.

Example 5

An electrolytic capacitor was manufactured in the same manner as in Example 1 except for, in adjusting the pH, using, in place of the ammonia solution, a solution containing dimethylaminoethoxyethanol and water in a mass ratio of 10:90 and adjusting the pH of the dispersion to 6.9, and the evaluation of performance was conducted for the electrolytic capacitor.

Comparative Example 1

A capacitor element was manufactured whose solid electrolyte layer was formed by impregnating the capacitor element with the dispersion A for 5 minutes and then heating the capacitor element at 150° C. for 20 minutes to remove a solvent component (water). That is, adjustment of the pH was not performed. An electrolytic capacitor was manufactured in the same manner as in Example 1 except for using the resultant capacitor element, and the evaluation of performance was conducted for the electrolytic capacitor.

Comparative Example 2

To the dispersion A (pH 1.7) were added and mixed 1.05 parts by mass of dimethylaminoethoxyethanol relative to 100 parts by mass of the conductive polymer to prepare a dispersion B having a pH of 7.7. The capacitor element was impregnated with the resultant dispersion B for 5 minutes. Then, a solvent component (water) was removed by heating the capacitor element at 150° C. for 20 minutes to manufacture a capacitor element in which a solid electrolyte layer was formed. An electrolytic capacitor was manufactured in the same manner as in Example 1 except for using the resultant capacitor element, and the evaluation of performance was conducted for the electrolytic capacitor.

In the meantime, viscosity of the dispersion B was measured immediately after mixing dimethylaminoethoxyethanol and 24 hours after the mixing and was 30.5 Pa·s and 45.7 Pa·s, respectively.

Table 1 shows results of the examples and the comparative examples.

TABLE 1

|  | Electrostatic capacity (μF) | ESR (mΩ) | Leakage current (μA) |
|---|---|---|---|
| Example 1 | 317 | 11.08 | 3.7 |
| Example 2 | 328 | 10.33 | 2.7 |
| Example 3 | 327 | 10.36 | 3.4 |
| Example 4 | 329 | 10.40 | 2.5 |
| Example 5 | 326 | 10.33 | 2.5 |
| Comparative Example 1 | 274 | 15.36 | 10.3 |
| Comparative Example 2 | 282 | 14.87 | 2.6 |

As shown in Table 1, the electrolytic capacitors in the comparative examples were low in electrostatic capacity and large in the ESR value and leakage current. In Comparative Example 1, the results are considered to be due to progression of corrosion in the dielectric layer caused by contact with the dispersion A having a pH of 1.7. In Comparative Example 2, it is considered that the pH of the dispersion was adjusted to around neutrality (pH 7.7) in advance to allow progression in aggregation of the conductive polymer, deteriorating a film formation property of a conductive polymer to decrease the electrostatic capacity and increase the ESR. In contrast with the results of the comparative examples, it is considered that, in the examples, both the corrosion of the dielectric layer and the aggregation of the conductive polymer were suppressed to improve the electrostatic capacity and reduce the ESR and the leakage current.

The viscosity of the dispersion A used in the examples which was measured 24 hours after the preparation was about 1.5 times the viscosity immediately after the preparation. On the other hand, the viscosity of the dispersion B used in Comparative Example 2 which was measured 24 hours after adding dimethylaminoethoxyethanol exceeded 3 times the viscosity immediately after the adding. Thus, in the dispersion B, the aggregation of the conductive polymer proceeded as compared to in the dispersion A, largely decreasing a pot life of the dispersion.

The present disclosure can be used for electrolytic capacitors including a conductive polymer as a cathode material.

What is claimed is:

1. An electrolytic capacitor production method comprising:
    impregnating an anode body having a dielectric layer with a dispersion containing a conductive polymer and a first solvent;
    adjusting a pH of the dispersion with which the anode body has been impregnated; and
    removing at least a part of the first solvent from the anode body after adjusting the pH of the dispersion.

2. The electrolytic capacitor production method according to claim 1, wherein the pH of the dispersion is adjusted to be close to 7 in adjusting the pH of the dispersion.

3. The electrolytic capacitor production method according to claim 1, wherein the pH of the dispersion with which the anode body has been impregnated ranges from 2.8 to 8.3, both inclusive, after adjusting the pH of the dispersion but before removing at least the part of the first solvent from the anode body.

4. An electrolytic capacitor production method comprising:
    impregnating an anode body having a dielectric layer with a dispersion containing a conductive polymer and a first solvent;
    adding a base to the dispersion with which the anode body has been impregnated; and
    removing at least a part of the first solvent from the anode body after adding the base to the dispersion.

5. The electrolytic capacitor production method according to claim 4, wherein a content of the first solvent in the dispersion with which the anode body has been impregnated ranges from 1000 parts by mass to 100000 parts by mass, both inclusive, relative to 100 parts by mass of the conductive polymer immediately before adding the base to the dispersion.

6. The electrolytic capacitor production method according to claim 4, wherein the base includes a nitrogen-containing base.

7. The electrolytic capacitor production method according to claim 6, wherein the nitrogen-containing base is at least one selected from the group consisting of ammonia, an amine, and a quaternary ammonium salt.

8. The electrolytic capacitor production method according to claim 4, wherein the base is added to the dispersion in a form of a solution containing the base and a second solvent in adding the base to the dispersion.

9. The electrolytic capacitor production method according to claim 6, wherein at least a part of the second solvent as well as at least the part of the first solvent is removed in removing at least the part of the first solvent from the anode body.

10. The electrolytic capacitor production method according to claim 1, the electrolytic capacitor production method further comprising impregnating the anode body with an electrolyte solution after removing at least the part of the first solvent from the anode body.

11. The electrolytic capacitor production method according to claim 4, the electrolytic capacitor production method further comprising impregnating the anode body with an electrolyte solution after removing at least the part of the first solvent from the anode body.

* * * * *